United States Patent
Yuge

(10) Patent No.: US 10,710,051 B2
(45) Date of Patent: *Jul. 14, 2020

(54) ADSORPTION MATERIAL

(71) Applicant: NEC CORPORATION, Tokyo (JP)

(72) Inventor: Ryota Yuge, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/085,217

(22) PCT Filed: Feb. 28, 2017

(86) PCT No.: PCT/JP2017/007786
§ 371 (c)(1),
(2) Date: Sep. 14, 2018

(87) PCT Pub. No.: WO2017/159350
PCT Pub. Date: Sep. 21, 2017

(65) Prior Publication Data
US 2019/0111409 A1    Apr. 18, 2019

(30) Foreign Application Priority Data
Mar. 16, 2016 (JP) ................................. 2016-052228

(51) Int. Cl.
*C01B 32/18* (2017.01)
*B01J 20/20* (2006.01)
(Continued)

(52) U.S. Cl.
CPC ....... *B01J 20/205* (2013.01); *B01J 20/28007* (2013.01); *B01J 20/28028* (2013.01);
(Continued)

(58) Field of Classification Search
CPC ............... B01J 20/205; B01J 20/28007; B01J 20/28028; B01J 20/3085; C01B 32/18;
(Continued)

(56) References Cited

U.S. PATENT DOCUMENTS

2004/0048744 A1    3/2004 Iijima et al.
2010/0075835 A1*   3/2010 Yuge ...................... B01J 21/185
                                                                502/150
(Continued)

FOREIGN PATENT DOCUMENTS

JP          3479889 B2    12/2003
JP       2004-016976 A     1/2004
(Continued)

OTHER PUBLICATIONS

Puretzky, Alexander A., et al. "Cumulative and continuous laser vaporization synthesis of single wall carbon nanotubes and nanohorns." Applied Physics A 93.4 (2008): 849-855.*
(Continued)

*Primary Examiner* — Richard M Rump
(74) *Attorney, Agent, or Firm* — Sughrue Mion, PLLC

(57) ABSTRACT

An adsorption material which includes a carbon nanohorn aggregate in which a plurality of single-walled carbon nanohorns aggregate in a fibrous state, particularly coexisting a globular carbon nanohorn aggregate and some of the single-walled carbon nanohorns included in the carbon nanohorn aggregate have an opening portion, is used. The adsorption material including such a fibrous carbon nanohorn aggregate is produced by a method including: preparing an inert gas atmosphere, a nitrogen gas atmosphere or a mixed atmosphere in a vessel in which a catalyst-containing carbon target is placed; and evaporating the target to obtain a carbon nanohorn aggregate including a fibrous carbon
(Continued)

nanohorn aggregate in which a plurality of single-walled carbon nanohorns aggregate in a fibrous state.

10 Claims, 3 Drawing Sheets

(51) Int. Cl.
    *B01J 23/745* (2006.01)
    *B01J 20/28* (2006.01)
    *B01J 20/30* (2006.01)
    *D01F 9/12* (2006.01)

(52) U.S. Cl.
    CPC ... *B01J 20/28069* (2013.01); *B01J 20/28078* (2013.01); *B01J 20/28088* (2013.01); *B01J 20/3085* (2013.01); *B01J 23/745* (2013.01); *C01B 32/18* (2017.08); *C01P 2004/03* (2013.01); *C01P 2004/04* (2013.01); *C01P 2004/50* (2013.01); *D01F 9/12* (2013.01)

(58) Field of Classification Search
    CPC .............. C01P 2004/03; C01P 2004/04; C01P 2004/50; D01F 9/12
    See application file for complete search history.

(56) References Cited

U.S. PATENT DOCUMENTS

| | | | |
|---|---|---|---|
| 2012/0202060 A1* | 8/2012 | Yuge | B82Y 30/00 428/367 |
| 2014/0329076 A1 | 11/2014 | Goino et al. | |

FOREIGN PATENT DOCUMENTS

| | | |
|---|---|---|
| JP | 2005-343885 A | 12/2005 |
| JP | 4188345 B2 | 11/2008 |
| JP | 4234812 B2 | 3/2009 |
| JP | 5299943 B2 | 9/2013 |
| WO | 02/060579 A1 | 8/2002 |
| WO | 2013/058382 A1 | 4/2013 |

OTHER PUBLICATIONS

Yuge, Ryota, et al. "Preparation and Characterization of Newly Discovered Fibrous Aggregates of Single-Walled Carbon Nanohorns." Advanced Materials 28.33 (2016): 7174-7177.*

Ryota Yuge et al., "Structure and Electrical Properties of Fibrous Aggregates of Carbon Nanohorns," 2016 Nen The 63rd JSAP Spring Meeting [Koen Yokoshu], Mar. 3, 2016, p. 14-115 (1 page), 21a-S421-6.

Ryota Yuge et al., "Preparation and Characterization of Fibrous Aggregates of Single-Walled Carbon Nanohorns," The 49th Fullereness-Nanotubes-Graphene General Symposium Koen Yoshishu, Sep. 7, 2015, p. 65 (2 pages), 1P-22.

Ryota Yuge et al., "Characterization and Supercapacitor Properties of Fibrous Aggregates of Single-Walled Carbon Nanohorns," The 5th Fullereness-Nanotubes-Graphene General Symposium Koen Yoshishu, Feb. 19, 2016, p. 83 (2 pages), 1P-43.

International Search Report of PCT/JP2017/007786 dated May 30, 2017.

* cited by examiner

[Fig. 1]
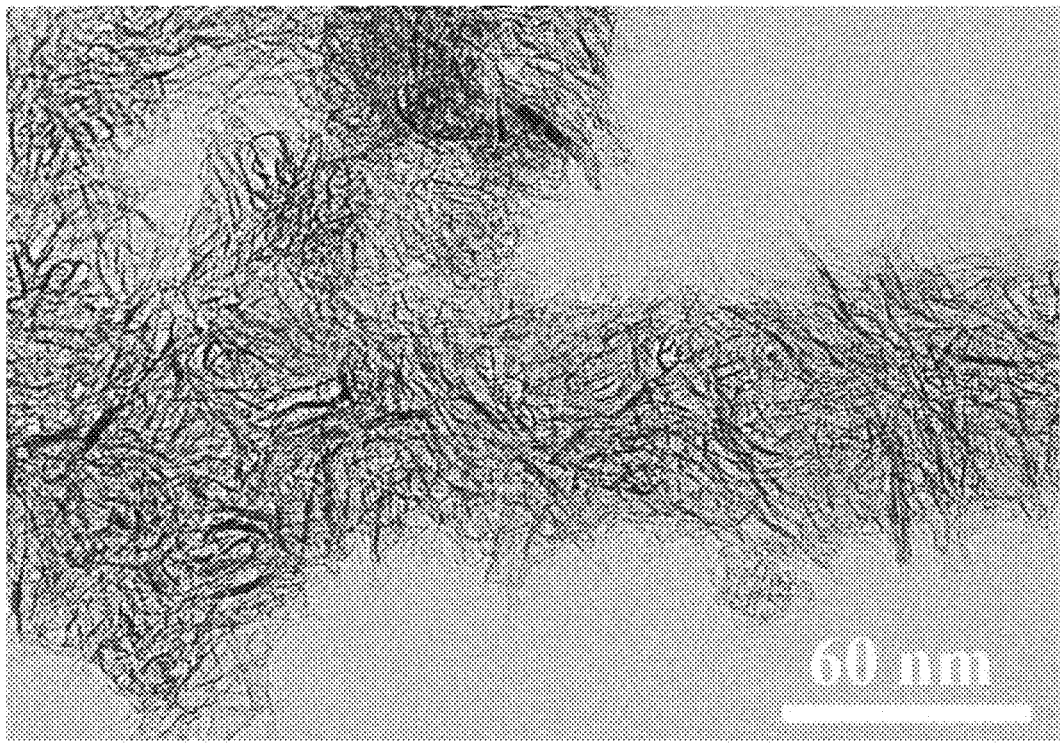
[Fig. 2]
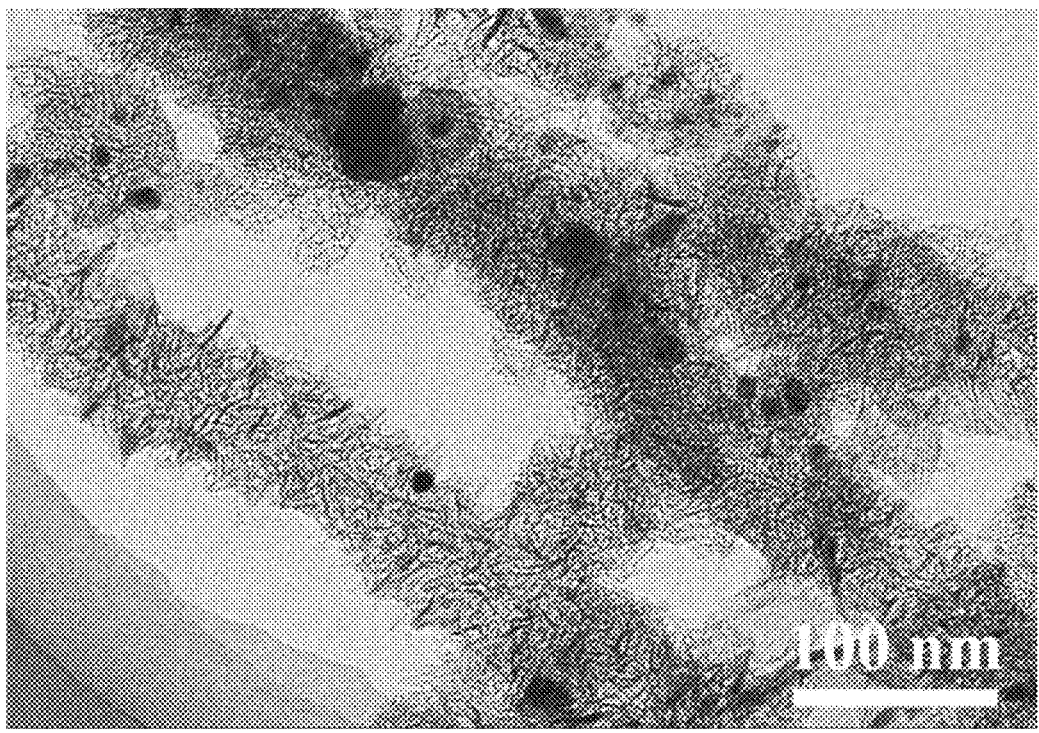

[Fig. 3]
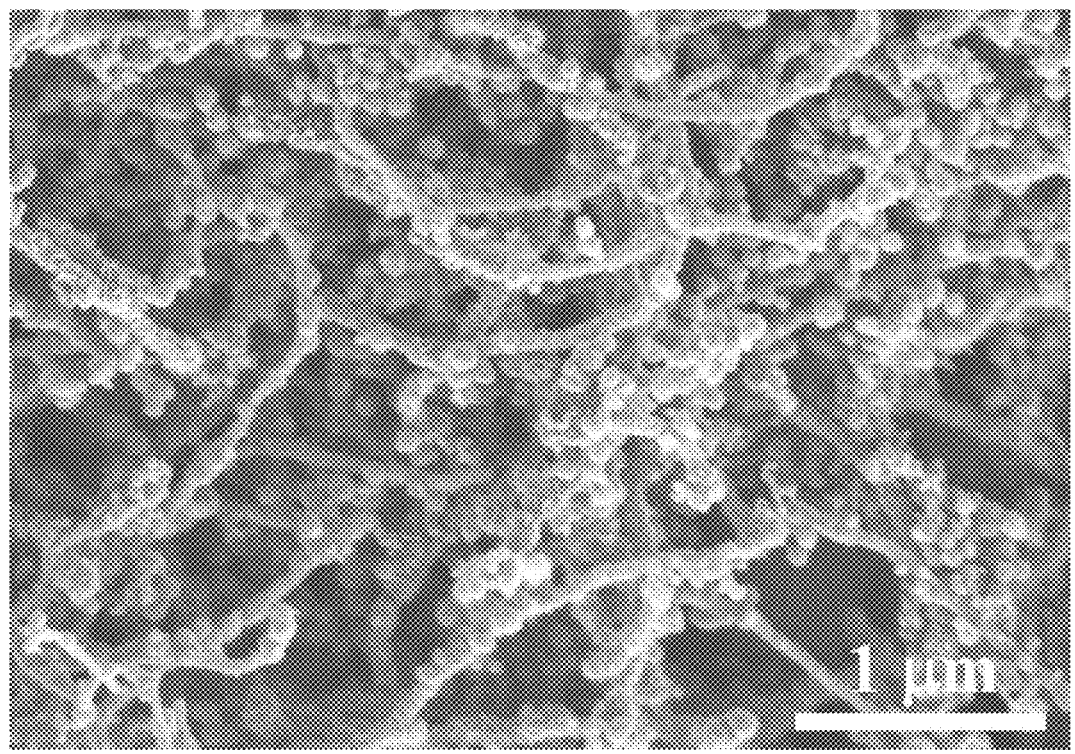
[Fig. 4]
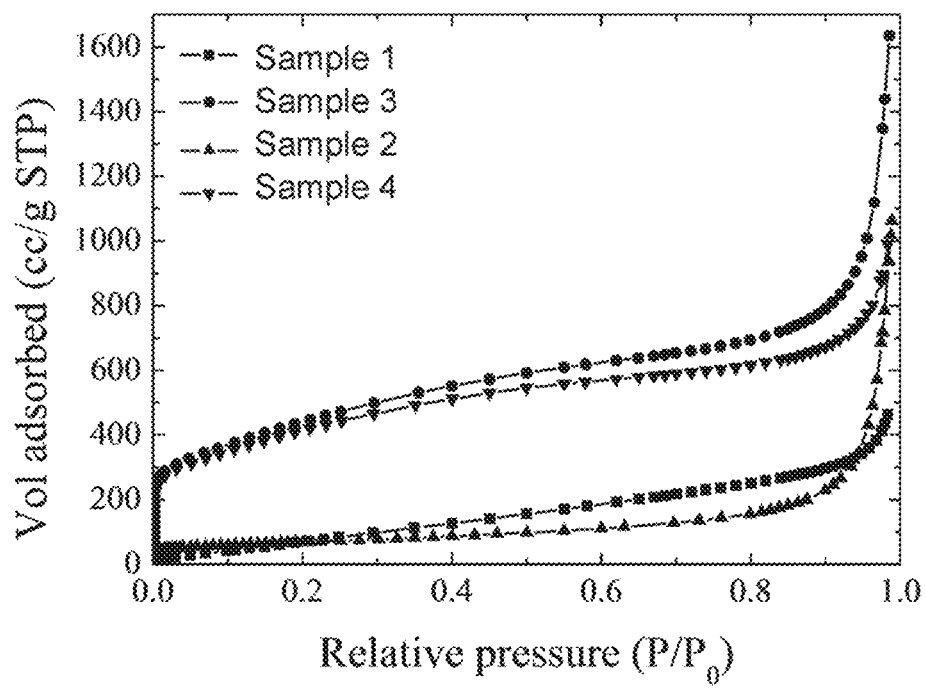

[Fig. 5]
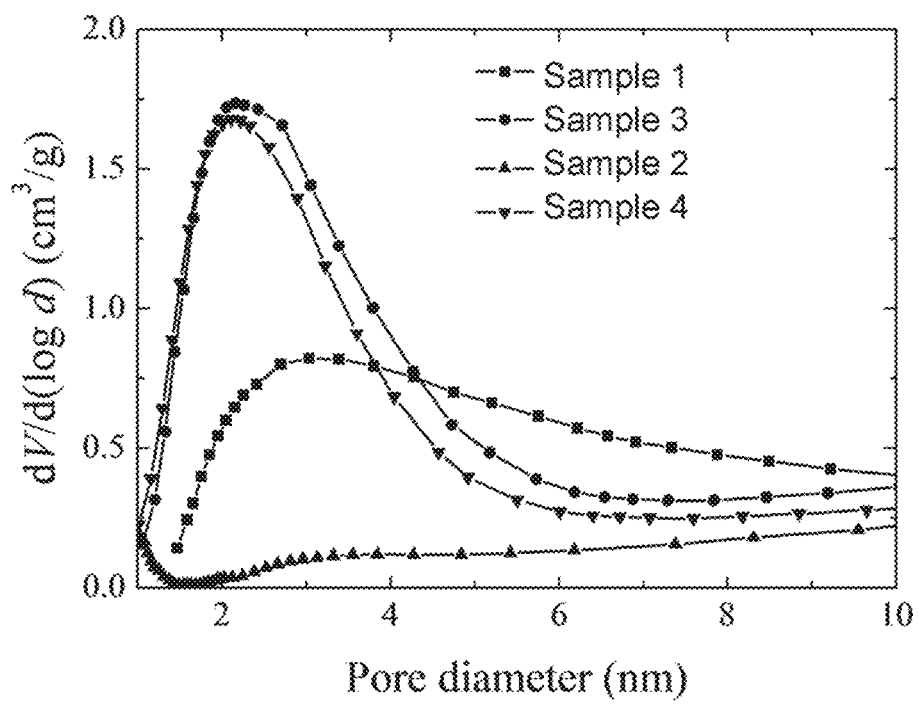

ADSORPTION MATERIAL

CROSS REFERENCE TO RELATED APPLICATIONS

This application is a National Stage of International Application No. PCT/JP2017/007786 filed Feb. 28, 2017, claiming priority based on Japanese Patent Application No. 2016-052228 filed Mar. 16, 2016, the disclosure of which is incorporated herein in its entirety by reference.

TECHNICAL FIELD

The present invention relates to an adsorption material using a fibrous carbon nanohorn aggregate.

BACKGROUND ART

Activated carbon, a widely used carbonaceous adsorbent, has large specific surface area and a relatively large pore size. This requires control of the size and the distribution of pores by a thermal decomposition method, an activation method, a thermal modification method, etc. Another problem is that having various surface functional groups and low crystallinity, activated carbon is significantly degraded when reproduced.

In addition to carbonaceous adsorbents, zeolite, for example, is known, which has pores of molecular size and has a molecular sieve effect. However, the disadvantage of zeolite is its poor chemical stability as it is degraded by strong acid and strong alkali and its heavy weight because of the high density.

A carbon nanohorn aggregate is an aggregate in which a tubular structure made of a six-membered carbon ring with a diameter of 2 to 5 nm and a length of 40 to 50 nm is radially aggregated, and is an excellent adsorption material which has large specific surface area, uniform pores and high crystallinity (Patent Literature 1, Patent Literature 2). For this reason, the aggregate is suitable for adsorbing gas such as hydrogen, fluorine, methane, boron and ammonia (Patent Literature 3, Patent Literature 4) and liquid such as water, ethanol, toluene and xylene. Furthermore, having a tubular structure, the carbon nanohorn aggregate is capable of including and releasing various substances (Patent Literature 5). Moreover, due to its aggregate structure, the carbon nanohorn aggregate can be used as a carrier which carries metal, oxide etc. (Patent Literature 6).

CITATION LIST

Patent Literature

Patent Literature 1: JP4234812B
Patent Literature 2: JP4188345B
Patent Literature 3: JP2004-16976A
Patent Literature 4: JP5299943B
Patent Literature 5: JP2005-343885A
Patent Literature 6: JP3479889B

SUMMARY OF INVENTION

Technical Problem

However, conventional carbon nanohorn aggregates easily agglomerate when dried, although they are globular aggregates and thus highly dispersible in liquid. Therefore, when used as an adsorption material, they have the problem of re-agglomeration when adsorbing substances. Another problem is that since the aggregate agglomerates densely, it is difficult to control the flow rate of gas and liquid.

An object of the present invention is to provide an adsorption material made of a carbon nanohorn aggregate which has large specific surface area and uniform pores and is difficult to agglomerate.

Solution to Problem

The present inventors have intensively investigated on carbon nanohorn aggregates which exhibit excellent adsorption ability, and as a result have found a fibrous carbon nanohorn aggregate which has large specific surface area and uniform pores and is difficult to agglomerate. Furthermore, unlike conventional fibrous materials, this fibrous carbon nanohorn aggregate has high dispersibility, and thus is less likely to re-agglomerate when dried, and therefore is easy to handle. It has also been found that this carbon nanohorn aggregate can be produced simultaneously with a globular carbon nanohorn aggregate, which is an excellent adsorbent. Thus, by changing the ratio of the fibrous carbon nanohorn aggregate to the globular carbon nanohorn aggregate, the flow rate of liquid and gas can be controlled when the aggregate is used as an adsorbent, and thus the adsorbent can exhibit adsorption ability suitable for applications.

Accordingly, an embodiment of the present invention provides an adsorption material including a carbon nanohorn aggregate in which a plurality of single-walled carbon nanohorns aggregate in a fibrous state.

In another embodiment of the present invention, the fibrous carbon nanohorn aggregate is at least one of a seed-shaped, a bud-shaped, a dahlia-shaped, a petal dahlia-shaped and a petal-shaped carbon nanohorn aggregate, which is connected in a fibrous state.

Furthermore, the adsorbent further includes a globular carbon nanohorn aggregate of a seed-shaped, a bud-shaped, a dahlia-shaped, a petal dahlia-shaped or a petal-shaped carbon nanohorn aggregate, which does not constitute the above fibrous carbon nanohorn aggregate.

The present invention also provides an adsorption material in which some of the single-walled carbon nanohorns included in the carbon nanohorn aggregate have an opening portion.

The adsorption material further includes at least one kind of activated carbon, carbon black, a carbon nanotube, graphene, zeolite, silica gel and alumina.

The adsorption material including a carbon nanohorn aggregate according to an embodiment of the present invention can be produced by a method including:
(1) preparing an inert gas atmosphere, a nitrogen gas atmosphere or a mixed atmosphere thereof in a vessel in which a catalyst-containing carbon target is placed;
(2) evaporating the target; and
(3) forming an opening in the carbon nanohorn aggregate obtained.

Advantageous Effects of Invention

The present invention provides an adsorption material made of a fibrous carbon nanohorn aggregate which has large specific surface area and uniform pores and is difficult to agglomerate. Furthermore, unlike conventional fibrous materials, this fibrous carbon nanohorn aggregate has high dispersibility, and thus is less likely to re-agglomerate when dried, and therefore is easy to handle. Furthermore, this carbon nanohorn aggregate can be produced simultaneously with a globular carbon nanohorn aggregate, which is an excellent adsorbent. By changing the ratio of the fibrous carbon nanohorn aggregate to the globular carbon nanohorn aggregate, thus the adsorption material can control in the flow rate of liquid and gas when the mixture is used as an adsorbent, and can exhibit adsorption ability suitable for applications. Furthermore, the fibrous carbon nanohorn aggregate provides specific surface area and pore volume larger than those of existing globular carbon nanohorns.

The method of producing an adsorption material including a carbon nanohorn aggregate of the present invention has fewer steps than existing methods, and thus is inexpensive and highly mass productive.

BRIEF DESCRIPTION OF DRAWINGS

FIG. 1 is a transmission electron micrograph of a fibrous carbon nanohorn aggregate and a globular carbon nanohorn aggregate prepared according to the present invention.

FIG. 2 is a transmission electron micrograph of a fibrous carbon nanohorn aggregate and a globular carbon nanohorn aggregate prepared according to the present invention.

FIG. 3 is a scanning electron micrograph of a fibrous carbon nanohorn aggregate and a globular carbon nanohorn aggregate prepared according to the present invention.

FIG. 4 shows adsorption isotherms of nitrogen on Samples 1 to 4 prepared in Examples.

FIG. 5 shows pore distributions of Samples 1 to 4 prepared in Examples.

DESCRIPTION OF EMBODIMENT

The present invention has the above characteristics. Example embodiments will be described below.

FIG. 1 and FIG. 2 show a transmission electron microscopic (TEM) image of a fibrous carbon nanohorn aggregate according to an example embodiment. The single-walled carbon nanohorn constituting the fibrous carbon nanohorn aggregate according to the present example embodiment is the same as the single-walled carbon nanohorn constituting a conventional globular carbon nanohorn aggregate. A seed-shaped, a bud-shaped, a dahlia-shaped, a petal dahlia-shaped and/or a petal-shaped (a graphene sheet structure) carbon nanohorn aggregate is connected to form a fibrous carbon nanohorn aggregate according to the present example embodiment. In other words, the fibrous structure includes one or more of these carbon nanohorn aggregates. Furthermore, since a target with a catalytic metal is evaporated to prepare a fibrous carbon nanohorn aggregate and a globular carbon nanohorn aggregate (FIG. 3), the catalytic metal is found inside or outside the aggregate (non-transmissive particles in FIG. 2). When a fibrous carbon nanohorn aggregate is produced by the method according to the present invention, a globular carbon nanohorn aggregate is simultaneously produced. FIG. 3 is a scanning electron micrographic (SEM) image of a fibrous carbon nanohorn aggregate and a globular carbon nanohorn aggregate prepared according to the present invention. The presence of a fibrous product and a globular product as shown in FIG. 3 provides a structure in which the fibrous product is difficult to agglomerate. Furthermore, being fibrous, the product has more spaces than conventional globular carbon nanohorns. In the present description, the fibrous carbon nanohorn aggregate and the globular carbon nanohorn aggregate are collectively referred to simply as a carbon nanohorn aggregate in some cases. The fibrous carbon nanohorn aggregate and the globular carbon nanohorn aggregate can be separated by using, for example, a centrifugal separation method, utilizing the difference in the settling rate after being dispersed in a solvent, or by gel permeation chromatography. Furthermore, when impurities other than carbon nanohorn aggregates are present, they can be removed by using a centrifugal separation method, utilizing the difference in the settling rate, or separating by size. A change in the condition of production enables the ratio of the fibrous carbon nanohorn aggregate to the globular carbon nanohorn aggregate to be changed. Increasing the amount of the fibrous carbon nanohorn aggregate improves the flow rate of gas or liquid to be adsorbed. As used herein, "fibrous" refers to a state in which the shape is maintained even after the above operation of separation, not a state in which globular carbon nanohorn aggregates are only connected and apparently fibrous.

The structure of the carbon nanohorn aggregate according to the present invention is not limited to the above structure as long as single-walled carbon nanohorns aggregate in a fibrous state. Fine holes are formed in the single-walled carbon nanohorn of the carbon nanohorn aggregate and a substance is incorporated into the single-walled carbon nanohorn through the opening to improve adsorption ability. Since the single-walled carbon nanohorn includes a structure other than a 6-membered ring on the tip or the side, those portions are predominantly oxidized in an oxidation treatment to form an opening portion. FIG. 4 and FIG. 5 show an adsorption isotherm and pore distribution of a mixture of a fibrous carbon nanohorn aggregate and a globular carbon nanohorn aggregate according to an example embodiment. Forming an opening significantly improves specific surface area and increases pore volume, which corresponds to the diameter of the sheath of the single-walled carbon nanohorn. Furthermore, the mixture has larger specific area and pore volume than a carbon nanohorn aggregate made of only a globular one.

Each of the single-walled carbon nanohorns obtained has a diameter of about 1 nm to 5 nm and a length of 30 nm to 100 nm. The fibrous carbon nanohorn aggregate has a diameter of about 30 nm to 200 nm and a length of about 1 µm to 100 µm. By contrast, the globular carbon nanohorn aggregate has nearly a uniform size of a diameter of about 30 nm to 200 nm.

The carbon nanohorn aggregate obtained is formed of a seed-shaped, a bud-shaped, a dahlia-shaped, a petal dahlia-shaped or a petal-shaped nanohorn alone, or in combination. The seed-shaped one has almost no or no angular projections on the surface; the bud-shaped one has a few angular projections on the surface; the dahlia-shaped one has many angular projections on the surface; and the petal-shaped one has a petal-like projection on the surface. The petal structure refers to a graphene sheet structure having a width of 50 to 200 nm and a thickness of 0.34 to 10 nm with 2 to 30 sheets. The petal dahlia-shaped one has an intermediate structure between the dahlia-shaped one and the petal-shaped one. The globular carbon nanohorn aggregates are separately produced in a mixed state with the fibrous carbon nanohorn aggregates. The form and the particle size of the globular carbon nanohorn aggregate produced vary depending on the type and the flow rate of the atmospheric gas.

The method of production involves heating and evaporating a target, which is carbon containing a catalyst (referred to as a catalyst-containing carbon target) and which has been placed in a vessel, by laser ablation in a nitrogen atmosphere, an inert atmosphere, hydrogen, carbon dioxide or a mixed atmosphere while rotating the target. The fibrous carbon nanohorn aggregate and the globular carbon nanohorn aggregate are obtained in the process of cooling carbon and catalyst which have been evaporated. Although some methods using a carbon target containing a catalyst have been known as a method of producing carbon nanotube, a pure (100%) graphite target containing no catalyst has been used for conventional carbon nanohorn aggregates (globular carbon nanohorn aggregates). In addition to the above laser ablation method, an arc discharge method and a resistance heating method can be used as the method of production. The laser ablation method, however, is more preferable because it enables continuous production at room temperature at the atmospheric pressure.

The laser ablation (LA) method applied in the present invention is a method in which a target is irradiated with a pulsed or continuous laser light, and when the irradiation intensity reaches or exceeds the threshold, the target converts the energy to form plume, and a product is deposited on a substrate installed on the downstream of the target, or is produced in a space in the apparatus, and then is recovered in a recovery chamber.

In laser ablation, $CO_2$ laser, YAG laser, excimer laser, semiconductor laser or the like can be used. $CO_2$ laser whose output can be easily increased is most suitable. For $CO_2$ laser, an output of 1 $kW/cm^2$ to 1,000 $kW/cm^2$ can be used, and continuous irradiation and pulse irradiation can be employed. For the production of carbon nanohorn aggregates, continuous irradiation is more desirable. Laser light is condensed by a ZnSe lens or the like, and the condensed light is used for irradiation. Rotating the target makes it possible to synthesize the product continuously. Although the target rotation speed can be arbitrarily set, 0.1 to 6 rpm is particularly preferable. If the rotation speed is 0.1 rpm or more, graphitization can be suppressed; and if the rotation speed is 6 rpm or less, increase of forming amorphous carbon can be prevented. The laser output in this case is preferably 15 $kW/cm^2$ or more, and a laser output of 30 to 300 $kW/cm^2$ is most effective. A laser output of 15 $kW/cm^2$ or more allows the target to be moderately evaporated to facilitate the production of carbon nanohorn aggregates. A laser output of 300 $kW/cm^2$ or less prevents amorphous carbon from increasing. The pressure in the vessel (chamber) can be set at 13,332.2 hPa (10,000 Torr) or less. The closer to vacuum conditions the pressure, the more likely carbon nanotubes are to be produced and the less likely carbon nanohorn aggregates are to be obtained. The pressure is preferably 666.61 hPa (500 Torr) to 1,266.56 hPa (950 Torr), and more preferably nearly normal pressure (1,013 hPa (1 atm≅760 Torr) for mass synthesis and cost reduction. The irradiation area, which is controlled according to the laser output and the degree of light condensation by a lens, can be set to 0.005 $cm^2$ to 1 $cm^2$.

Fe, Ni and Co can be used singly or in a mixture as a catalyst. The concentration of the catalyst can suitably be selected and is preferably 0.1% by mass to 10% by mass, and more preferably 0.5% by mass to 5% by mass with respect to carbon. When the concentration is 0.1% by mass or more, fibrous carbon nanohorn aggregates are surely produced. When the concentration is 10% by mass or less, increase in the cost of target can be suppressed.

The temperature in the vessel is optional, and the vessel is used at preferably 0 to 100° C., and more preferably room temperature for mass synthesis and cost reduction.

Nitrogen gas, an inert gas, hydrogen gas, $CO_2$ gas, etc., singly or a mixture thereof is introduced into the vessel so that the inside of the vessel is set to the atmosphere of these gasses. Nitrogen gas and Ar gas are preferred considering the cost. The gas is circulated in the reaction vessel and substances generated can be recovered by the flow of the gas. The vessel can be a closed atmosphere with the introduced gas. The flow rate of the atmospheric gas is optional and preferably in the range of 0.5 L/min to 100 L/min. The flow rate of the gas is kept constant in the step of evaporating the target. To keep the flow rate of the gas constant, the flow rate of gas introduced is matched with the flow rate of gas discharged. When the gas is flowed at nearly normal pressure, the gas in the vessel is discharged by pressing by the gas introduced.

In the fibrous carbon nanohorn aggregate and the globular carbon nanohorn aggregate obtained as described above, part of their carbon skeleton may be replaced by a catalytic metal element, a nitrogen atom and the like.

Fine holes are formed (to form opening) in the carbon nanohorn aggregate by an oxidation treatment. This oxidation treatment forms, in the opening, a surface functional group containing oxygen. For the oxidation treatment, a gas phase process and a liquid phase process can be used. In the gas phase process, heat treatment is carried out in an atmospheric gas containing oxygen, such as air, oxygen and carbon dioxide. Of them, air is suitable in consideration of the cost. Furthermore, the temperature of the treatment can be in the range of 300 to 650° C., more preferably 400 to 550° C. A temperature of 300° C. or more eliminates the concern of no burning of carbon and failure to form openings. A temperature of 650° C. or less prevents the whole carbon nanohorn aggregate from burning. The liquid phase process is carried out in a liquid containing an oxidizing substance such as nitric acid, sulfuric acid and hydrogen peroxide. Nitric acid can be used in the temperature range of room temperature to 120° C. When the temperature is 120° C. or less, oxidizing power does not increase too much and materials are not oxidized excessively. Hydrogen peroxide can be used in the temperature range of room temperature to 100° C., and more preferably 40° C. or more. When the temperature is in the range of 40 to 100° C., the oxidizing power works well and openings can be efficiently formed. Furthermore, using light irradiation in combination is more effective in the liquid process.

The catalytic metal included in the formation of the carbon nanohorn aggregate can be removed before the oxidation treatment. The catalytic metal can be removed by dissolving it in nitric acid, sulfuric acid and hydrochloric acid. Hydrochloric acid is suitable in consideration of the easiness of use. The temperature at which the catalyst is dissolved can be suitably selected. To remove the catalyst thoroughly, it is desirable that heating be carried out at 70° C. or more. When using nitric acid and sulfuric acid, the removal of catalyst and the formation of an opening may be carried out simultaneously or continuously. Furthermore, since the catalyst may be covered with a carbon film in the production of a carbon nanohorn aggregate, a pre-treatment is preferably carried out to remove the carbon film. It is desirable that the pre-treatment be carried out by heating at about 250 to 450° C. in air. Although a partial opening may be formed at 300° C. or more as described above, the formation of an opening is a preferred aspect in the present invention and thus is not a problem.

The crystallinity of the carbon nanohorn aggregate obtained can be improved by heat treatment in a non-oxidizing atmosphere such as inert gas, hydrogen or vacuum. The temperature of heat treatment can be 800 to 2,000° C., and preferably 1,000 to 1,500° C. Furthermore, while surface functional groups containing oxygen are formed in the opening after the treatment of forming openings, the surface functional groups may be removed by heat treatment. The temperature of the removal treatment can be 150 to 2,000° C. It is desirable that surface functional groups such as carboxyl group and hydroxyl group be removed at 150° C. to 600° C. It is desirable that surface functional groups such as carbonyl group be removed at 600° C. or more. Surface functional groups can also be removed by reduction in a gas or liquid atmosphere. Hydrogen can be used in the reduction in the gas atmosphere, and it can also be used for improving crystallinity as described above. Hydrazine, etc. can be used as the liquid atmosphere.

The above mixture of the fibrous carbon nanohorn aggregate and the globular carbon nanohorn aggregate (hereinafter also referred to as a carbon nanohorn aggregate mixture) can be used as the adsorption material directly, or after separating the fibrous carbon nanohorn aggregate, or after forming the opening. A nano carbon composite prepared by mixing the carbon nanohorn aggregate with at least one of activated carbon, carbon black such as Ketjen black, a carbon nanotube, a graphene, zeolite, silica gel and alumina can be used as the adsorption material. Such an adsorption material can be used as an adsorbent for gas such as hydrogen, fluorine, methane, boron and ammonia and liquid such as water, ethanol, toluene and xylene. This can also be used as an adsorbent for removing metal such as iron, cobalt, nickel, silver, platinum, gold, copper and cesium. The adsorption material can also be used for removing organic substances or hazardous substances. The adsorption material can also be used as an adsorbent for an adsorption heat pump, an adsorbent for uremic toxin, an adsorbent for deodorization and an adsorbent for purification of water.

The form of use of the adsorption material can be adjusted depending on substances intended to be adsorbed. For example, the carbon nanohorn aggregate obtained can be used after placing it in a suitable container or bag, formed on various substrates as an adsorption layer, or molded into a shape such as pellets. The carbon nanohorn aggregate of the present invention has high dispersibility and thus is less likely to re-agglomerate when dried unlike conventional fibrous materials, and also is less likely to re-agglomerate compared to a carbon nanohorn aggregate made of only a globular one. Thus, the carbon nanohorn aggregate has excellent properties such that an adsorption layer can be formed on a substrate and various molded articles can be prepared.

Furthermore, a sustained release drug or the like can be adsorbed to the adsorption material of the present invention, and the resultant can be used as a sustained release agent. The adsorption material of the present invention, in particular, one in which openings are formed has excellent adsorption ability, and thus is capable of adsorbing and incorporating into the opening a large amount of drugs. Thus, a sustained release agent whose duration of sustained release is extended is provided.

EXAMPLE

Hereinafter, the present invention will be described in more detail by way of Examples. Of course, the present invention is not limited to the following Examples.

Example 1, Comparative Example 1

A carbon target containing 5% by mass of iron was irradiated with $CO_2$ laser in a nitrogen atmosphere to prepare a fibrous carbon nanohorn aggregate and a globular carbon nanohorn aggregate (Sample 1). Details of experiment will be described below. The carbon target containing iron was rotated at 2 rpm. The target was continuously irradiated with $CO_2$ laser at an energy density of 150 kW/cm$^2$. The temperature of the chamber was room temperature. The flow rate of nitrogen was adjusted to 10 L/min in the chamber. The pressure was controlled at 933.254 to 1,266.559 hPa (700 to 950 Torr). Furthermore, a sample was prepared by laser ablation in a nitrogen atmosphere in the same conditions except for using a carbon target containing no catalyst as a comparative sample (Sample 2).

FIG. 3 shows an SEM image of Sample 1. Fibrous matter and globular matter are observed. The fibrous matter had a diameter of about 30 to 100 nm and a length of about a several micrometers to several ten micrometers. The globular matter had a diameter of about 30 to 200 nm and had a substantially uniform size. FIG. 1 and FIG. 2 are a TEM image of a product. The results of observation show that fibrous matter was made of single-walled carbon nanohorns with a diameter of 1 to 5 nm and a length of about 40 to 50 nm which aggregated in a fibrous state. In addition to fibrous matter, globular matter was observed. Seed-shaped, bud-shaped, dahlia-shaped and petal dahlia-shaped carbon nanohorn aggregates were found to be mixed. Black iron particles were also found inside or on the surface of the fibrous carbon nanohorn aggregate and the globular carbon nanohorn aggregate. By contrast, no fibrous matter was found in Sample 2 although globular matter was found.

Example 2, Comparative Example 2

Sample 1 and Sample 2 were heat treated in air. For Sample 1, the temperature was increased to 460° C. at 1° C./minute, and Sample 1 was left to cool to room temperature (Sample 3). For Sample 2, the temperature was increased to 500° C. at 1° C./minute, and Sample 2 was left to cool to room temperature (Sample 4). The temperatures of the above heat treatment were different because Sample 1 contained catalyst and burned at a slightly low temperature.

The specific surface area and the pore volume (1 to 100 nm) of Samples 1 to 4 obtained above were measured by a nitrogen adsorption method at 77K. FIG. 4 and FIG. 5 each show an adsorption isotherm and pore distribution at 77K. Table 1 shows specific surface area and pore volume. Sample 1 containing a fibrous carbon nanohorn aggregate was found to have larger specific surface area and pore volume than Sample 2 containing no fibrous carbon nanohorn aggregate. It has also been found that for Sample 3 and Sample 4 in which openings were formed by an oxidation treatment, Sample 3 containing a fibrous carbon nanohorn aggregate had significantly improved specific surface area and pore volume.

Next, agglomeration properties of the sample which contained a fibrous carbon nanohorn aggregate and the sample which did not contain it were evaluated. Sample 1 (1 mg) was immersed in 30 ml of ethanol and the resultant was ultrasonically dispersed for 15 minutes to prepare a dispersion. The dispersion obtained was dropped on a silicon substrate and dried. This was repeated until the film thickness was 1 μm. Film was prepared in the same manner using Sample 2. A uniform film was prepared when Sample 1 was used. By contrast, the film prepared using Sample 2 cracked on the substrate. This is because the globular carbon nanohorn aggregate which had been dispersed re-agglomerated when ethanol was evaporated.

Xylene was used to compare the amount of adsorption of solvent to the sample. The sample was placed in a closed vessel in which atmosphere is saturated with vapor of xylene so that the sample adsorbed xylene. The adsorption was carried out in air atmosphere at room temperature over 1 hour. Then the sample was subjected to thermogravimetry in a helium atmosphere and the amount of adsorption was estimated from the reduction in weight. The range of temperature was room temperature to 600° C. with rising rate of 5° C./minute. As a result, the amount of adsorption of xylene of Samples 1, 2, 3, 4 was 0.11, 0.09, 0.41 and 0.37 g/g, respectively, per 1 g of the sample. The results show that Sample 1 and Sample 3 are each a superior adsorbent compared to conventional adsorbents of Sample 2 and Sample 4. The results are summarized in Table 1.

TABLE 1

| | | Oxidation treatment | Specific surface area ($m^2$/g) | Pore volume (ml/g) 1-100 nm | Amount of adsorption of xylene (g/g) |
|---|---|---|---|---|---|
| Example 1 | Sample 1 | None | 350 | 0.86 | 0.11 |
| Comparative Example 1 | Sample 2 | None | 250 | 0.80 | 0.09 |
| Example 2 | Sample 3 | Done | 1580 | 2.15 | 0.41 |
| Comparative Example 2 | Sample 4 | Done | 1480 | 1.34 | 0.37 |

While the invention has been particularly shown and described with reference to example embodiments and Examples, the present invention is not limited to these example embodiments and Examples. It will be understood by those of ordinary skill in the art that various changes in form and details may be made therein without departing from the sprit and scope of the present invention.

The invention claimed is:

1. An adsorption material comprising a fibrous carbon nanohorn aggregate in which a plurality of single-walled carbon nanohorns aggregate in a fibrous state.

2. The adsorption material according to claim 1, wherein the fibrous carbon nanohorn aggregate has a diameter of 30 nm to 200 nm and a length of 1 μm to 100 μm.

3. The adsorption material according to claim 1, wherein each of the single-walled carbon nanohorns has a diameter of 1 nm to 5 nm and a length of 30 nm to 100 nm, and has a horn-shaped tip.

4. The adsorption material according to claim 1, wherein the fibrous carbon nanohorn aggregate is one of which at least one of a seed-shaped, a dahlia-shaped, a bud-shaped, a petal dahlia-shaped and a petal-shaped carbon nanohorn aggregate is connected in a fibrous state.

5. The adsorption material according to claim 4, further comprising at least one kind of globular carbon nanohorn aggregate of a seed-shaped, a bud-shaped, a dahlia-shaped, a petal dahlia-shaped and a petal-shaped carbon nanohorn aggregate, which does not constitute the fibrous carbon nanohorn aggregate.

6. The adsorption material according to claim 1, wherein some of the single-walled carbon nanohorns have an opening portion.

7. The adsorption material according to claim 1, further comprising at least one kind of activated carbon, carbon black, a carbon nanotube, graphene, zeolite, silica gel and alumina.

8. A method of producing the adsorption material according to claim 1, comprising:
preparing an inert gas atmosphere, a nitrogen gas atmosphere or a mixed atmosphere thereof in a vessel in which a catalyst-containing carbon target is placed; and
evaporating the target to obtain a carbon nanohorn aggregate comprising a fibrous carbon nanohorn aggregate in which a plurality of single-walled carbon nanohorns aggregate in a fibrous state.

9. The method of producing an adsorption material according claim 8, further comprising forming an opening portion in the single-walled carbon nanohorn by subjecting the carbon nanohorn aggregate obtained to an oxidation treatment.

10. The method of producing an adsorption material according claim 9, wherein the oxidation treatment is a gas phase process comprising heat treatment in an atmospheric gas containing oxygen or a liquid phase process carried out in a liquid containing an oxidizing substance.

* * * * *